V. MALEN.
JACK SCREW.
APPLICATION FILED MAR. 23, 1917.

1,325,484.

Patented Dec. 16, 1919.

Inventor:
Victor Malen

UNITED STATES PATENT OFFICE.

VICTOR MALEN, OF OLNEY, OREGON.

JACK-SCREW.

1,325,484.     Specification of Letters Patent.     Patented Dec. 16, 1919.

Application filed March 23, 1917. Serial No. 157,033.

*To all whom it may concern:*

Be it known that I, VICTOR MALEN, a subject of Russia, having declared my intention to become a citizen of the United States, residing at Olney, in the county of Clatsop and State of Oregon, have invented a new and useful Jack-Screw, of which the following is a specification.

My invention relates to improvements in jack-screws in which a main or outside screw revolves in a casing and within said main screw is a central screw which revolves within the main or outside screw; that the objects of my improvement are, first to provide quick raising of objects by means of said jack-screw; second, to have the work of two jack-screws combined in one; third, to provide for the lifting of objects considerably higher than by means of the ordinary jack-screws.

I attain these objects by the apparatus or mechanism illustrated in the accompanying drawing, in which—

Figure 1:
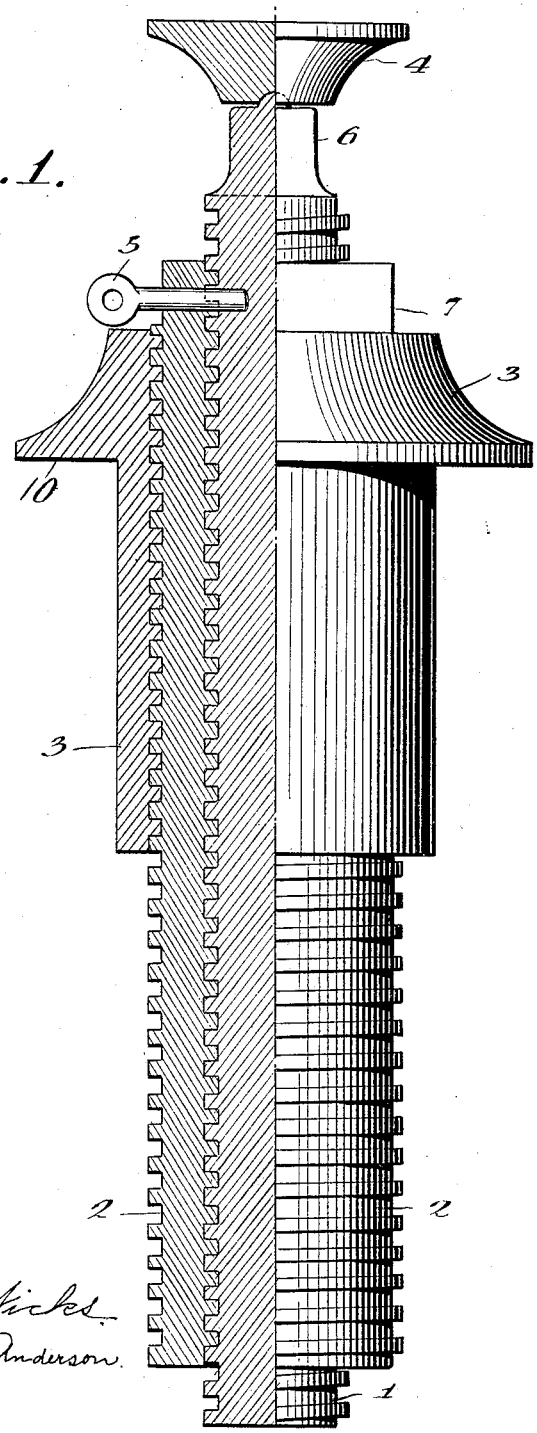
Figure 2:

Figure 1 is a half elevation and half section of the jack-screw; Fig. 2 is the elevation of a key used in revolving said screws.

The following numerals explain the different parts of the apparatus:

No. 1 is the central screw which is fitted into and revolves within the main or outside screw which is designated No. 2, both being absolutely round, and the said No. 2 is fitted into and revolves within the casing 3 which said casing has a flange marked 10 for support of jack-screw when in use; 4 is the cake or bolster upon which rests the object to be lifted; 5 is a pin inserted through a hole in said main screw 2 and extending into the central screw 1, a hole being provided also in screw 1 for that purpose; 6 is the neck of 1, and 7 is the neck of 2; 6 and 7 can be made hexagonal, octagonal, or square, preferably square so that revolving power can be most conveniently applied thereto by means of the key shown in Fig. 2. 8 is a notch cut square on the one end of the key so as to fit neck 7 of 2 in Fig. 1; 9 is a notch cut square on the other end of the key so as to fit neck 6 of 1 in Fig. 1. Cake 4 revolves on 6.

The apparatus is used as follows: The cribbing or supports are placed under the flange of casing 3, and bolster or cake 4 is placed under the object to be lifted; the key, Fig. 2, is placed or inserted into neck 7 by fitting end 8 of key thereto; the pin 5 is inserted in place so that central screw rises with the outside or main screw 2; when the said screw has been revolved as high as desired, or as high as possible, the pin 5 is removed and the end 9 of the key is inserted and fitted to neck 6, and then by means of said key the central screw 1 is revolved until it has risen to the desired height. By reversing the process, the screws 1 and 2 can be restored to their original positions. The pin 5 can be fastened to the apparatus by means of a small chain so as to prevent misplacing or loss of same.

I claim:

A jack comprising a tubular supporting member having a flange formed at the upper end only, a main screw adjustably mounted in the member, an auxiliary screw having screw threaded engagement with the main screw for axial movement relative to the main screw, said screws provided with openings registering when the screws are in normal position relative to each other, and a single pin for insertion in the openings for locking the screws together.

VICTOR MALEN.